United States Patent Office.

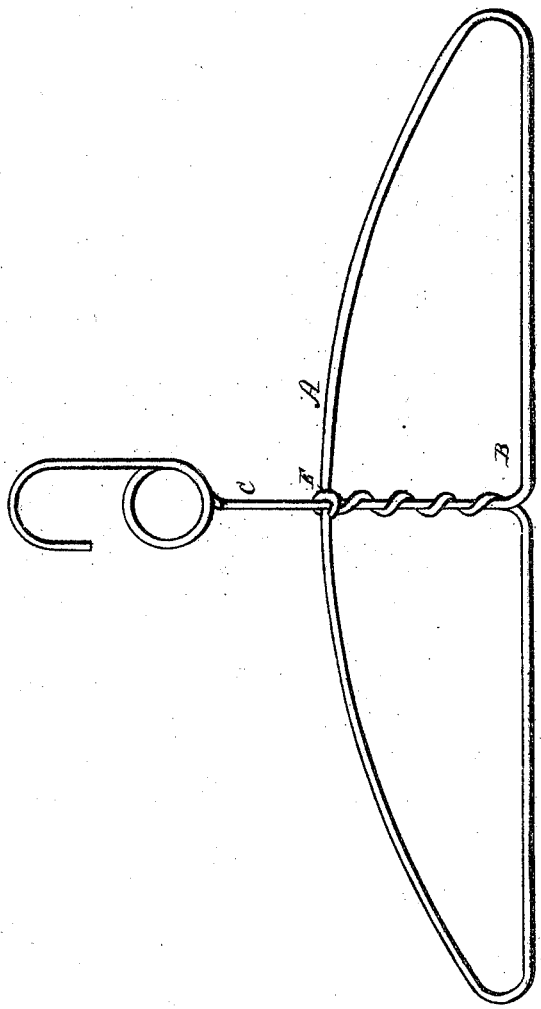

E. N. SNOW, OF CHICOPEE, MASSACHUSETTS.

Letters Patent No. 97,562, dated December 7, 1869.

IMPROVED GARMENT-SUSPENDER.

The Schedule referred to in these Letters Patent and making part of the same.

*To all whom it may concern:*

Be it known that I, E. N. SNOW, of Chicopee, Hampden county, State of Massachusetts, have invented a new and useful Improvement in Garment Suspenders; and I do hereby declare that the following is a full and clear description thereof, reference being had to the accompanying drawings, and to the letters of reference marked thereon.

In the drawings—

Figure 1 is a front view of my improved suspender.

This invention consists in an improved construction of the suspending-frame for garments, such as is shown in Leach and Wardwell's patent of July, 1868, No. 79,580, whereby the same is rendered compact, strong, and serviceable.

In the patent referred to, the frame was quite weak at one particular and essential point, i e, where the upright brace, which the hook or eye was formed on, was attached to the upper curved piece marked A in my drawings. This attachment was made by soldering the horizontal piece and vertical piece together where they crossed.

The two pieces forming the lower horizontal brace were also connected together at the centre by soldering, one of them forming the vertical piece already referred to, and the other being bent and soldered to it at the side for a distance of about an inch. In this construction, the solder was continually giving way, and letting the frame fall apart.

In my construction, however, the two ends of the wire are brought together at a central point, B, of the lower horizontal line, and one of them, C, is extended above the curved piece A and the hook formed upon it.

There is no solder used in the connection either of the two ends of the wire or of the vertical and curved pieces; but the end E (not forming the piece with the hook) is twisted around the piece C, from the bottom to the point where it crosses the upper curved piece A, and is there bent around them both diagonally, as is shown in the figure, securely holding the parts together.

This makes a simple and easily manufactured article, very strongly braced and connected at the points where strength is essential.

Now, having described my invention,

What I claim, is—

The construction by which the vertical piece of wire C and the elliptical piece are connected, by twisting the end of A around the piece C at E, and in the means of suspending it, as shown and described.

E. N. SNOW.

Witnesses:
 EDWARD H. HYDE,
 M. P. HYDE.